Oct. 16, 1962

M. A. BERGSTEDT 3,058,704

LAMINATED ADHESIVE SHEETING FOR AIRCRAFT

Filed Jan. 16, 1958

INVENTOR.
MILTON A. BERGSTEDT
BY
Morgan, Finnegan, Durham & Pine
ATTORNEYS

United States Patent Office 3,058,704
Patented Oct. 16, 1962

3,058,704
LAMINATED ADHESIVE SHEETING FOR AIRCRAFT
Milton A. Bergstedt, Linden, N.J., assignor, by mesne assignments, to Johnson & Johnson, New Brunswick, N.J., a corporation of New Jersey
Filed Jan. 16, 1958, Ser. No. 709,221
2 Claims. (Cl. 244—119)

The present invention relates to novel laminated adhesive sheetings adapted to minimize the effects of undesirable influences on aircraft fuselages in use such as vibrating-producing forces, conductive heat and radiant heat.

An airplane fuselage includes a plurality of spaced longitudinal and circumferential brace members constituting a multiplicity of frames and a stressed skin covering of relatively thin but stiff metallic sheets attached to and traversing said frames. In use, the skin portion traversing a frame is subjected to forces normally productive of vibrations in said skin portion, wherein said vibration unless inhibited, would cause the development of sound waves in the audible range directed toward the interior of the fuselage. Moreover, the fuselage may also be subjected to conductive heat and radiant heat in use.

It is an object of this invention to provide novel non-inflammable laminated adhesive sheeting possessing such characteristics that when attached to the skin of an aircraft fuselage, it serves as a sound dampening panel to sound insulate the fuselage of aircraft. Another object of this invention is to provide novel non-inflammable laminated adhesive sheeting which, when attached to the skin of aircraft fuselage, serves as a thermal insulator against both conductive heat and radiant heat.

It has been found that the foregoing objects may be realized by forming a laminated adhesive sheet comprising two sheets of flexible lightweight metallic foil joined by a layer of laminating adhesive of high internal viscosity and which is temporarily distortable in all three planes of space and dimensionally recuperative, and a layer of a normally tacky and pressure-sensitive adhesive of high internal viscosity and which is temporarily distortable in all three planes of space and dimensionally recuperative on the face of one of the metallic foils to form an inner layer adapted to contact the skin of the fuselage. Both the inner layer of adhesive to contact the fuselage and the laminating adhesive have a thickness in the range of ½ to 4 oz./sq. yd. and each of the metallic foils has a thickness in the range of .00035 to 3 mils and preferably 1 to 2 mils. It should be realized that a plurality of laminae comprising metallic foils joined by a laminating adhesive may be used in conjunction with an inner layer of normally tacky pressure-sensitive adhesive having the properties set forth hereinabove. Preferably, the laminating adhesive is normally tacky and pressure-sensitive.

The preferred metallic foil to be used in accordance with this invention is aluminum foil. Other light metallic foils which are useful are foils made from magnesium, beryllium, titanium and the like. In use, the metallic foils when they are connected to the fuselage by means of the normally tacky and pressure-sensitive adhesive assume a rigid state whereby they serve to resist flexural movement of the fuselage panel. Moreover, each metallic foil locally resists stresses caused by the adhesive layer or layers adjacent thereto when the adhesive is subjected to distortion forces. Then too, the metallic foils assist in returning the adhesive layers to their original shape after they have been distorted. Metallic foils having a reflective surface such, for example, as aluminum, are particularly desirable for they serve as reflectors of radiant heat. Another advantage of the metallic foils is their non-inflammability which insures a safe tape.

Figure 3:
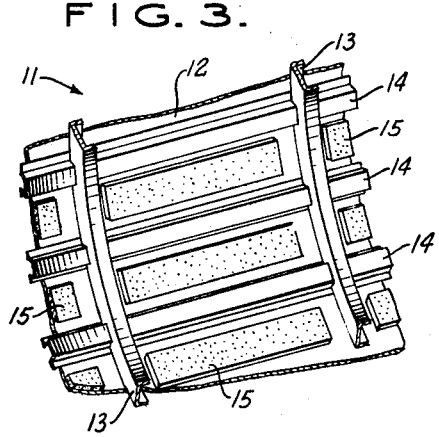
FIG. 3 is a fragmentary perspective view, partly in section, of an airplane fuselage provided with the present adhesive sheeting.

In FIG. 3 there is shown a portion of a conventional aircraft fuselage 11 which is a framed structure, including a stressed skin 12 supported by a framework made up of annular bulkheads 13 attached at their outer, or larger, peripheries to the inner face of the skin at longitudinally spaced intervals. Longitudinally extending, circumferentially, or peripherally, spaced stringers 14 are attached to the inner face of said skin at generally equi-spaced peripheral locations thereof and pass through the bulkheads as shown. In using the adhesive sheet of this invention, the side of the sheet 15 having an exposed coating of normally and pressure-sensitive adhesive is applied to the skin 12 of the fuselage. This layer of adhesive serves to absorb and dissipate the flexural vibrations of the area of the fuselage covered by the adhesive lamina. This absorption by the adhesive causes a temporary distortion thereof without impairing the integrity or nature of the laminae comprising the adhesive sheet. In like manner, the layer or layers of laminating adhesive also functions as sound dampening means.

As indicated heretofore, the adhesive layer applied to the skin of the fuselage is normally tacky and pressure-sensitive in nature. It is preferred that the elastomer used in forming the adhesive by a combination of reclaimed natural rubber and a synthetic elastomer type such, for example, as "GRS" rubbers (butadiene-styrene). If so desired, minor amounts of crude rubber may be present to enhance the quick-stick qualities of the adhesive. Best results are obtained when the adhesive lamina in contact with the fuselage is a mixture of reclaimed rubber and GRS (butadiene-styrene copolymer elastomer). Such adhesive compositions are normally applied in a spongy condition which improves their sound dampening qualities. In addition to serving as sound dampening means, it also functions as a thermal insulator in preventing conductive heat from going into or coming out of the fuselage.

It has been found that for best characteristics the combination metallic foils employed should not all possess the same hardness characteristics but rather a combination of foils of different hardness should be employed. For example, adhesive sheeting formed by the utilization of foils which are all soft lacks sufficient rigidity to most effectively withstand the forces encountered in use. On the other hand, if the metallic foils are all hard, the resulting adhesive sheet lacks the desired flexibility for easy application.

The adhesive sheets of the present invention are generally wound in a roll. It has been found that when the roll is unwound, there is less tendency for the tape to curl when the metallic foil adjacent the inner, normally tacky and pressure-sensitive layer (adapted to contact the fuselage) is softer in nature than the next outer layer of metallic foil. Moreover, it has been found desirable to provide each side of the metallic foils in contact with adhesive with priming means to improve the anchorage of the adhesive layers to the metallic foils. The desired priming effect may be accomplished by applying a primer composition to each side of the metallic foils in contact with an adhesive layer. Examples of suitable primer compositions for this purpose are casein-rubber latex compositions manufactured by Borden Chemical Company and sold under the trade name "Casco Flexible Cement 8496–D." Examples of additional primer compositions which may be used are those disclosed in Schechtman U.S. Patent No. 2,576,148. Another effective way of improving anchorage of an adhesive layer to a metallic foil sandwiched therebetween is to provide the metallic foil with perforations. Suitable perforations are those 1/16″ in diameter spaced so as to provide 25 perforations per square inch. In this construction adhesive material fills up the perforations and improves the anchorage of the adhesive layers encasing the metallic foil containing said perforations.

The following are examples of normally tacky and pressure-sensitive adhesives which may be used in forming the novel tapes of this invention. The amounts given are in percent by weight.

In Examples 1–3 below:
"GRS" is a butadiene-styrene copolymer having a Mooney viscosity of 50.

"Circosol 2XH" is a hydrocarbon oil manufactured by Sun Oil Company.

"Ionol" is 2,6-ditertiary butyl 4 methyl phenol manufactured by Shell Chemical Company.

"Staybelite Ester 10" is a hydrogenated methyl ester of rosin manufactured by Hercules Powder Company.

"Santovar A" is 2,5 ditertiary amyl hydroquinone manufactured by Monsanto Chemical Company.

"Piccolyte–S–115" is a terpene resin (polymer of beta pinene) manufactured by Penn. Industrial Chemical Company.

*Example I*

| Ingredient: | Percent by weight |
|---|---|
| GRS | 15.0 |
| Reclaimed rubber | 26.0 |
| Smoked sheet rubber | 6.0 |
| Zinc oxide | 20.0 |
| Circosol 2XH | 3.0 |
| Ionol | 1.0 |
| 10% phenol modified polyterpene Resin (M.P. 125–135° C.) | 28.0 |
| Zinch dibutyl dithio carbamate | 1.0 |
| | 100.0 |

*Example II*

| Ingredient: | |
|---|---|
| GRS | 18.2 |
| Air-dri-crude rubber | 18.2 |
| Zinc oxide | 30.0 |
| Staybelite ester No. 10 | 17.4 |
| Santovar A | 0.5 |
| Ionol | 0.5 |
| Lecithin | 0.2 |
| Piccolyte–S–115 | 15.0 |
| | 100.0 |

*Example III*

| Ingredient: | |
|---|---|
| GRS | 15.00 |
| Reclaim (pure gum) rubber | 21.50 |
| Smoked sheet rubber | 6.23 |
| Zinc oxide | 25.30 |
| Ionol | 0.07 |
| Santovar A | 0.07 |
| 10% phenol modified polyterpene Resin (M.P. 125–135° C.) | 28.50 |
| Triphenyl phosphite | 2.50 |
| Tetraethylene pentamine | 0.50 |
| | 100.00 |

The following examples are given hereinbelow to illustrate the manufacture of a novel sound dampening tape formed in accordance with the present invention.

In the below Examples IV–VIII, the sides of the metallic foils in contact with the adhesive layers are first primed with a suitable primer such, for example, as rubber latex-casein mixture primer manufactured by Borden Chemical Company and sold under the trade name "Casco Flexible Cement 8496–D."

*Example IV*

Figure 1:
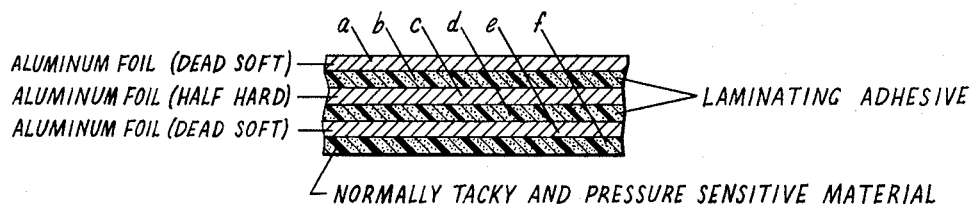
FIG. 1 is a vertical cross section of one embodiment of the adhesive sheeting of the invention wherein three layers of non-perforated metallic foil are employed.

Reference is made to FIG. 1 of the accompanying drawing. In this construction the sides of metallic foils $a$, $c$ and $e$ in contact with adhesive layers $b$, $d$ and $f$ are provided with a primer coat (not shown). On one side of an aluminum foil $a$ (1.7 mil dead soft) is coated an adhesive layer $b$ of the adhesive of Example III at a coating weight of 1.5 oz./sq. yd. A second aluminum foil $c$ (1.7 mil one-half yard) is applied to adhesive layer $b$ to form a laminate. On the opposite side of aluminum foil $c$ is coated an adhesive $d$ of the adhesive of Example III at a coating weight of 1.5 oz./sq. yd. A third aluminum foil $e$ (1.7 mil dead soft) is applied to adhesive layer $d$. On the opposite side of aluminum foil $c$ is applied an adhesive layer $f$ of the adhesive of Example III at a coating weight of 1.5 oz./sq. yd.

The tape produced above may be used for sound dampening by pressing normally tacky and pressure-sensitive adhesive layer $f$ against the inner surface of the skin of a fuselage.

Following the above procedure outlined in Example IV additional samples of sound dampening tapes may be prepared as follows:

*Example V*

Two layers of 3 mil dead soft aluminum foil are laminated by the adhesive of Example II at a coating weight of 0.5 oz./sq. yd. On the outer side of one of the aluminum foils is coated the adhesive of Example II at a coating weight of 2.5 oz./sq. yd.

*Example VI*

Three layers of 1.7 mil dead soft aluminum foil are laminated together by two layers of the adhesive of Example II, each at a coating weight of 1.5 oz./sq. yd. On the outer side of one of the outer layers is coated the adhesive of Example II at a coating weight of 1.5 oz./sq. yd.

*Example VII*

A layer of 1.7 mil dead soft aluminum foil, a layer of 1.5 mil full hard aluminum foil and a layer of 1.7 mil dead soft aluminum foil, respectively, are laminated together by two layers of the adhesive of Example III, each at a coating weight of 1.5 oz./sq. yd. On the outer side of one of the 1.7 mil dead soft aluminum foils is coated the adhesive of Example III at a coating weight of 1.5 oz./ sq. yd.

In the following Examples IX to XI, the sides of the outer metallic foils in contact with an adhesive layer are provided with a primer coat (not shown) for improving the anchorage of adhesive thereto. The sides of the intermediate metallic foil is not provided with primer coat but said foil is preforated whereby adhesive mass filling the perforations serves to improve the anchorage of the adhesive layers to the intermediate foil encased by said adhesive layers.

*Example IX*

Figure 2:
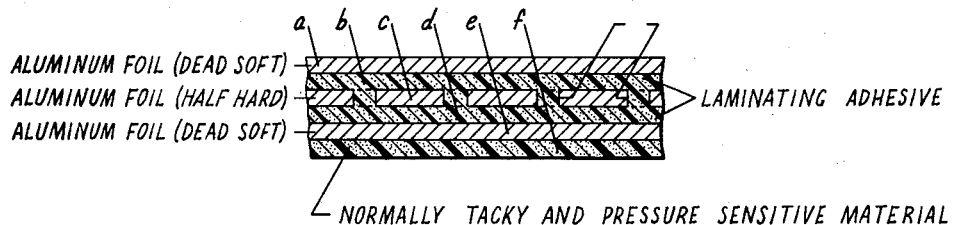
FIG. 2 is a vertical cross section of a second embodiment of the adhesive sheeting of the invention employing three layers of foil, the intermediate layers being a perforated sheet.

Reference is made to FIG. 2 of the accompanying drawings. In the construction shown one side of metallic foil $a$ and both sides of metallic foil $e$ are provided with primer coat (not shown) to improve the anchorage of adhesive layers $b$, $d$ and $f$ to said foils. Intermediate foil $c$ is provided with perforations which are filled by portions of adhesive $b$ and $d$.

A layer of 1.7 mil dead soft aluminum foil, a layer of 1.5 mil one-half hard perforated aluminum foil and a layer of 1.7 mil dead soft aluminum foil are laminated together by two layers of the adhesive of Example III, each at a coating weight of 1.0 oz./sq. yd. On the outer side of one of the 1.7 mil dead soft aluminum foils is coated the adhesive of Example III at a coating weight of 1.5 oz./sq. yd.

*Example X*

A layer of 1.7 mil dead soft aluminum foil, a layer of 2 mil dead soft perforated aluminum foil and a layer of 1.7 mil dead soft aluminum foil are laminated together by two layers of the adhesive of Example III, each at a coating weight of 1.0 oz./sq. yd. On the outer side of one of the 1.7 mil dead soft aluminum foils is coated the adhesive of Example III at a coating weight of 1.5 oz./sq. yd.

*Example XI*

A layer of 1.7 mil dead soft aluminum foil, a layer of 1.5 mil dead soft perforated aluminum foil and a layer of 1.7 mil dead soft aluminum foil are laminated together by two layers of the adhesive of Example III, each at a coating weight of 1.0 oz./sq. yd. On the outer side of one of the 1.7 mil dead soft aluminum foils is coated the adhesive of Example III at a coating weight of 1.5 oz./sq. yd.

The invention in its broader aspects is not limited to the specific steps, methods, compositions, combination and improvements described but departures may be made therefrom within the scope of the accompanying claims without departing from the principles of the invention and without sacrificing its chief advantages.

What is claimed is:

1. In an airplane having a fuselage including a plurality of spaced longitudinal and circumferential brace members constituting a multiplicity of frames and a stressed skin covering of relatively thin but stiff metallic sheets attached to and traversing said frames, the skin portion traversing a frame being subject to forces normally productive of vibration in said skin portion wherein said vibration, unless inhibited, would cause the development of sound waves in the audible range directed toward the interior of the fuselage, the combination with such skin portion of: a damping panel attached in intimate contact with said skin portion, said panel being comprised of an outer lightweight metallic foil laminated by means of a layer of a normally tacky and pressure-sensitive adhesive to a perforated intermediate lightweight metallic foil which in turn is laminated by means of a layer of normally tacky and pressure-sensitive adhesive to an inner lightweight metallic foil, the inner metallic foil being softer than the intermediate metallic foil, the perforations of said intermediate foil being filled with normally tacky and pressure-sensitive adhesive which serves to improve the anchorage of the laminating layers of normally tacky and pressure-sensitive adhesive to the sides of the intermediate foil in contact therewith, the side of the inner foil opposite the side in contact with the laminating adhesive layer having coated thereon a layer of a normally tacky and pressure-sensitive adhesive, each of said metallic foils being of a thickness in the range of about 1 to 3 mils, and each layer of normally tacky and pressure-sensitive adhesive being coated at a weight in the range of 0.5 to 4.0 oz./sq. yd. and of such nature that it has high internal viscosity, is temporarily distortable in all three planes of space and dimensionally recuperative.

2. In an airplane having a fuselage including a plurality of spaced longitudinal and circumferential brace members constituting a multiplicity of frames and a stressed skin covering of relatively thin but stiff metallic sheets attached to and traversing said frames, the skin portion traversing a frame being subject to forces normally productive of vibration in said skin portion wherein said vibration, unless inhibited, would cause the development of sound waves in the audible range directed toward the interior of the fuselage, the combination with such skin portion of: a damping panel attached in intimate contact with said skin portion, said panel being comprised of an outer lightweight metallic foil laminated by means of a layer of a normally tacky and pressure-sensitive adhesive to an intermediate lightweight metallic foil which in turn is laminated by means of a layer of normally tacky and pressure-sensitive adhesive to an inner lightweight metallic foil, the inner metallic foil being softer than the intermediate metallic foil, the side of the inner foil opposite the side in contact with the laminating adhesive layer having coated hereon a layer of a normally tacky and pressure-sensitive adhesive, each of said metallic foils being of a thickness in the range of about 1 to 3 mils, and each layer of normally tacky and pressure-sensitive adhesive being coated at a weight in the range of 0.5 to 4.0 oz./sq. yd. and of such nature that it has high internal viscosity, is temporarily distortable in all three planes of space and dimensionally recuperative.

References Cited in the file of this patent

UNITED STATES PATENTS

| | | |
|---|---|---|
| 1,670,678 | Cowper | May 22, 1928 |
| 2,106,133 | Goldman | Jan. 18, 1938 |
| 2,237,623 | Ledwinka | Apr. 8, 1941 |
| 2,442,347 | Eklund | June 1, 1948 |
| 2,552,664 | Burdine | May 15, 1951 |
| 2,576,148 | Schechtman | Nov. 27, 1951 |
| 2,724,670 | Mason | Nov. 22, 1955 |
| 2,804,416 | Phillipsen | Aug. 27, 1957 |
| 2,819,032 | Detrie et al. | Jan. 7, 1958 |

FOREIGN PATENTS

| | | |
|---|---|---|
| 305,694 | Great Britain | Feb. 8, 1929 |